United States Patent
Celik et al.

(10) Patent No.: US 11,167,594 B2
(45) Date of Patent: Nov. 9, 2021

(54) BELT STRUCTURE FOR A TIRE

(71) Applicants: The Goodyear Tire & Rubber Company, Akron, OH (US); TEIJIN ARAMID B.V., Arnhem (NL)

(72) Inventors: Ceyhan Celik, Stow, OH (US); James Gregory Gillick, Akron, OH (US); Robert Edward Lionetti, Bereldange (LU); Michel Henricus Jacobus van den Tweel, Leusden (NL); Tony Mathew, Arnhem (NL)

(73) Assignees: The Goodyear Tire & Rubber Company, Akron, OH (US); Teijin Aramid B.V., BM Arnhem (NL)

( * ) Notice: Subject to any disclaimer, the term of this patent is extended or adjusted under 35 U.S.C. 154(b) by 111 days.

(21) Appl. No.: 16/711,767

(22) Filed: Dec. 12, 2019

(65) Prior Publication Data

US 2021/0178818 A1    Jun. 17, 2021

(51) Int. Cl.
*B60C 9/20* (2006.01)
*B60C 9/26* (2006.01)
*B60C 9/00* (2006.01)

(52) U.S. Cl.
CPC .......... *B60C 9/2003* (2013.01); *B60C 9/0042* (2013.01); *B60C 2009/2077* (2013.01); *B60C 2009/2083* (2013.01); *B60C 2009/2096* (2013.01)

(58) Field of Classification Search
CPC .............................................. B60C 2009/2074
See application file for complete search history.

(56) References Cited

U.S. PATENT DOCUMENTS

| 5,223,061 | A |   | 6/1993  | Navaux |
|-----------|---|---|---------|--------|
| 5,355,922 | A | * | 10/1994 | Kogure ............... B60C 9/26 152/209.18 |
| 5,662,751 | A |   | 9/1997  | Creech |
| 5,863,362 | A |   | 1/1999  | Creech |
| 5,958,162 | A |   | 9/1999  | Creech |

(Continued)

FOREIGN PATENT DOCUMENTS

| EP |    0333628 A3 | 11/1989 |
|----|---------------|---------|
| EP |     463273 A1 |  1/1992 |

(Continued)

OTHER PUBLICATIONS

Machine Translation: JP-63175179-A, Oshima Kazuo, (Year: 2021).*

(Continued)

*Primary Examiner* — Kendra Ly
(74) *Attorney, Agent, or Firm* — Robert N. Lipcsik

(57) ABSTRACT

A tire includes a carcass ply, a tread disposed radially outward of a crown region of the carcass ply, and a belt structure having an overall axial width substantially equal to a tread width interposed between the tread and the crown region in circumferential surrounding relation to the carcass ply. The belt structure includes a first belt layer and a second belt layer radially adjacent the first belt layer. The first belt layer includes a first reinforced composite with first reinforcement cords embedded in a first rubber matrix. The first reinforcement cords have a construction of 1100/4 dtex with a twist between 150 TPM and 250 TPM and a dipping tension between 100 mN/tex and 200 mN/tex.

19 Claims, 2 Drawing Sheets

(56) References Cited

U.S. PATENT DOCUMENTS

| | | |
|---|---|---|
| 6,267,165 B1 | 7/2001 | Westgate et al. |
| 6,568,445 B1 | 5/2003 | Kojima |
| 2001/0006728 A1* | 7/2001 | Juijn .................. D01F 6/30 |
| | | 428/374 |
| 2003/0034107 A1* | 2/2003 | Westgate .............. D02G 3/48 |
| | | 152/527 |
| 2011/0259488 A1 | 10/2011 | Zhao et al. |
| 2011/0259501 A1 | 10/2011 | Assaad |
| 2018/0319217 A1 | 11/2018 | Fidan et al. |
| 2019/0329594 A1 | 10/2019 | Takenaka |

FOREIGN PATENT DOCUMENTS

| | | | |
|---|---|---|---|
| JP | S6171204 A | | 4/1986 |
| JP | 63175179 A | * | 7/1988 |
| JP | S63159543 A | | 7/1988 |

OTHER PUBLICATIONS

European Search Report for Serial No. EP20213232 dated Mar. 22, 2021.

Translation of Russia Search Report for Serial No. 2020140822 dated May 17, 2021.

* cited by examiner

BELT STRUCTURE FOR A TIRE

FIELD OF THE INVENTION

The present invention relates to both pneumatic and non-pneumatic tires, and more specifically, for a belt structure interposed between a tread portion and other structures of the tire.

BACKGROUND OF THE INVENTION

Belt assemblies for tires are known. In one conventional assembly, a folded ply may be reinforced with cords of high modulus material and may have an overall width at least equal to that of the tread portion. Each of its lateral sides may be folded back, in a radially outward direction, around two unfolded single cut plies. The reinforcing cords of the folded ply may form an angle between 20 and 60 degrees relative to the with respect to the equatorial plane of the tire with those of the two single cut plies forming equal and opposed angles with respect to the equatorial plane of the tire.

Because of material limitations, conventional tire constructions have tended to be robust (e.g., heavy and many components, etc.). Such constructions may tend to have a high rolling resistance, which lowers fuel economy; and the bulk of the construction may have a tendency to limit handling response, as well as increasing material cost. It has been a continuing goal to identify lightweight and high strength materials, and to find suitable uses for such materials in tires, such that the weight of tires may be reduced while other properties are maintained.

Aramid reinforcement material has shown excellent fatigue resistance. This property made the material suitable for application of a relatively low twist to the cord, which made it possible to maintain durability and elongation characteristics in a lower density material. One conventional belt assembly has shown improved handling properties when reinforcement cords were reduced to 1100 dTex from 1670 dTex. One conventional overlay structure may be reinforced with aramid cords having a twist level between 6 TPI and 14 TPI.

One conventional belt structure may be reinforced with 420 to 1100 dTex aramid cords, with a measured toughness of 30 MPa to 50 MPa, an initial modulus 15,000 MPa to 40,000 MPa, a tenacity of 140 cN/Tex to 200 cN/Tex, and a dynamic flex fatigue retained break strength of 50% to 100%. These belts may be reinforced with reinforcement cords extending parallel to one another and making an angle of 10° to 40° with respect to the equatorial plane (EP) of the tire. The belt assembly may comprise a folded belt with folded portions on each lateral side folded radially over a cut belt. The axially outer portions of the folded belt may be folded in a radially outward direction and disposed radially outward of the cut belt.

Another conventional tire may have an overlay structure disposed radially outward from the belt assembly. Helical convolutions of a ribbon may be wound axially across two single cut plies such that the convolutions are in abutting contact with each other. The ribbon may be reinforced with cords of textile material.

SUMMARY OF THE INVENTION

A tire in accordance with the present invention includes a carcass ply, a tread disposed radially outward of a crown region of the carcass ply, and a belt structure having an overall axial width substantially equal to a tread width interposed between the tread and the crown region in circumferential surrounding relation to the carcass ply. The belt structure includes a first belt layer and a second belt layer radially adjacent the first belt layer. The first belt layer includes a first reinforced composite with first reinforcement cords embedded in a first rubber matrix. The first reinforcement cords have a construction of 1100/4 dtex with a twist between 150 TPM and 250 TPM and a dipping tension for production between 100 mN/tex and 200 mN/tex.

According to another aspect of the tire, the second belt layer includes a second reinforced composite with second reinforcement cords embedded in a second rubber matrix. The second reinforcement cords have a construction of 1210/3 dtex with a twist between 150 TPM and 250 TPM and a dipping tension for production between 100 mN/tex and 200 mN/tex.

According to still another aspect of the tire, the first reinforcement cords have a Z twist of about 180 TPM.

According to yet another aspect of the tire, the first reinforcement cords have a S twist of about 180 TPM.

According to still another aspect of the tire, the second reinforcement cords have a Z twist of about 200 TPM.

According to yet another aspect of the tire, second reinforcement cords have a S twist of about 200 TPM.

According to still another aspect of the tire, the first reinforcement cords have a density within the first rubber matrix between 15 EPI and 35 EPI.

According to yet another aspect of the tire, the first reinforcement cords have a density within the first rubber matrix between 22 EPI and 25 EPI.

According to still another aspect of the tire, the first reinforcement cords have a density within the first rubber matrix of about 23 EPI.

According to yet another aspect of the tire, the second reinforcement cords have a density within the second rubber matrix between 15 EPI and 35 EPI.

According to still another aspect of the tire, the second reinforcement cords have a density within the second rubber matrix between 22 EPI and 25 EPI.

According to yet another aspect of the tire, the second reinforcement cords have a density within the second rubber matrix of about 24 EPI.

According to still another aspect of the tire, the first reinforcement cords are formed from aramid.

According to yet another aspect of the tire, the second reinforcement cords are formed from aramid.

According to still another aspect of the tire, the first and second reinforcement cords are both formed only from aramid.

A belt structure for a tire in accordance with the present invention includes a first belt layer disposed radially inward from a tread portion of the tire and radially outward from a crown portion of a carcass ply. The first belt layer has first aramid reinforcement cords each with a construction of 1100/4 dtex, a twist between 150 TPM and 250 TPM, and a dipping tension for production between 100 mN/tex and 200 mN/tex. A second belt layer is radially interposed between the first belt layer and the crown portion of the carcass ply. The second belt layer has second aramid reinforcement cords each with a construction of 1210/3, a twist between 150 TPM and 250 TPM, and a tension between 100 mN/tex and 200 mN/tex.

According to another aspect of the belt structure, the first reinforcement cords have a Z twist of about 180 TPM.

According to still another aspect of the belt structure, the first reinforcement cords and the second reinforcement cords both have a density within a first rubber matrix and a second rubber matrix, respectively, between 15 EPI and 35 EPI.

According to yet another aspect of the belt structure, the first reinforcement cords and the second reinforcement cords both have a density within a first rubber matrix and a second rubber matrix, respectively, between 22 EPI and 25 EPI.

According to still another aspect of the belt structure, the first reinforcement cords have a density within a first rubber matrix of 23 EPI and the second reinforcement cords have a density within a second rubber matrix of 24 EPI.

Definitions

As used herein and in the claims:

"Apex" means an elastomeric filler located radially above the bead core and between the plies and the turnup ply.

"Annular" means formed like a ring.

"Aramid" and "Aromatic polyamide" both mean a manufactured fiber in which the fiber-forming substance is generally recognized as a long chain of synthetic aromatic polyamide in which at least 85% of the amide linkages are attached directly to the two aromatic rings. Representative of an aramid or aromatic polyamide is a poly (p-phenylene-terephthalamide).

"Aspect ratio" means the ratio of a tire section height to its section width. For example, the aspect ratio may be the maximum axial distance between the exterior of the tire sidewalls when unloaded and inflated at normal pressure, multiplied by 100% for expression as a percentage. Low aspect ratio may mean a tire having an aspect ratio of 65 and below.

"Aspect ratio of a bead cross-section" means the ratio of a bead section height to its section width.

"Asymmetric tread" means a tread that has a tread pattern not symmetrical about the centerplane or equatorial plane (EP) of the tire.

"Axial" and "axially" refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane (EP) of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane (EP) of the tire. If multiple plies are present, the ply cords run at opposite angles in alternating layers.

"Breakers" means at least two annular layers or plies of parallel reinforcement cords having the same angle with reference to the equatorial plane (EP) of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane (EP). The "cord angle" is measured in a cured but uninflated tire.

"Cord twist" means each yarn of the cord has its component filaments twisted together a given number of turns per unit of length of the yarn (usually expressed in turns per inch (TPI) or turns per meter (TPM)) and additionally the yarns are twisted together a given number of turns per unit of length of the cord. The direction of twist refers to the direction of slope of the spirals of a yarn or cord when it is held vertically. If the slope of the spirals conforms in direction to the slope of the letter "S", then the twist is called "S" or "left hand". If the slope of the spirals conforms in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

"Cut belt ply" refers to a belt having a width less than the tread width, which lies flat over the carcass plies in the crown area of the tire.

"Crown" means that portion of the tire in the proximity of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made, that forms the basic element of filaments; characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High tensile steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360° rotation about another filament or strand.

"Load range" means load and inflation limits for a given tire used in a specific type of service as defined by tables in The Tire and Rim Association, Inc.

"Mega tensile steel (MT)" means a carbon steel with a tensile strength of at least 4500 MPa at 0.20 mm filament diameter.

"Net contact area" means the total area of ground contacting elements between defined boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal load" means the specific design inflation pressure and load assigned by the appropriate standards organization for the service condition for the tire.

"Normal tensile steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane (EP) of the tire.

"Radial ply tire" means a belted or circumferentially-restricted pneumatic tire in which at least one ply has cords which extend from bead to bead and the ply is laid at cord angles between 65° and 90° with respect to the equatorial plane (EP) of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section height" means the radial distance from the nominal rim diameter to the outer diameter of the tire at its equatorial plane (EP).

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super tensile steel (ST)" means a carbon steel with a tensile strength of at least 3650 MPa at 0.20 mm filament diameter.

"Tenacity" means stress expressed as force per unit linear density of the unstrained specimen (cN/tex).

"Tensile stress" is force expressed in force/cross-sectional area. Strength in psi=12,800 times specific gravity times tenacity in grams per denier.

"Tension" for a cord means force on the cord expressed as mN/tex.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turns per inch", or TPI, means turns of cord twist for each inch length of cord.

"Turnup end" means the portion of a carcass ply that turns upward (i.e., radially outward) from the beads about which the ply is wrapped.

"Ultra tensile steel (UT)" means a carbon steel with a tensile strength of at least 4000 MPa at 0.20 mm filament diameter.

"Vertical deflection" means the amount that a tire deflects under load.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

BRIEF DESCRIPTION OF THE DRAWINGS

The invention will be described by way of example and with reference to the accompanying drawings in which.

DETAILED DESCRIPTION OF EXAMPLES OF THE PRESENT INVENTION

Figure 1:
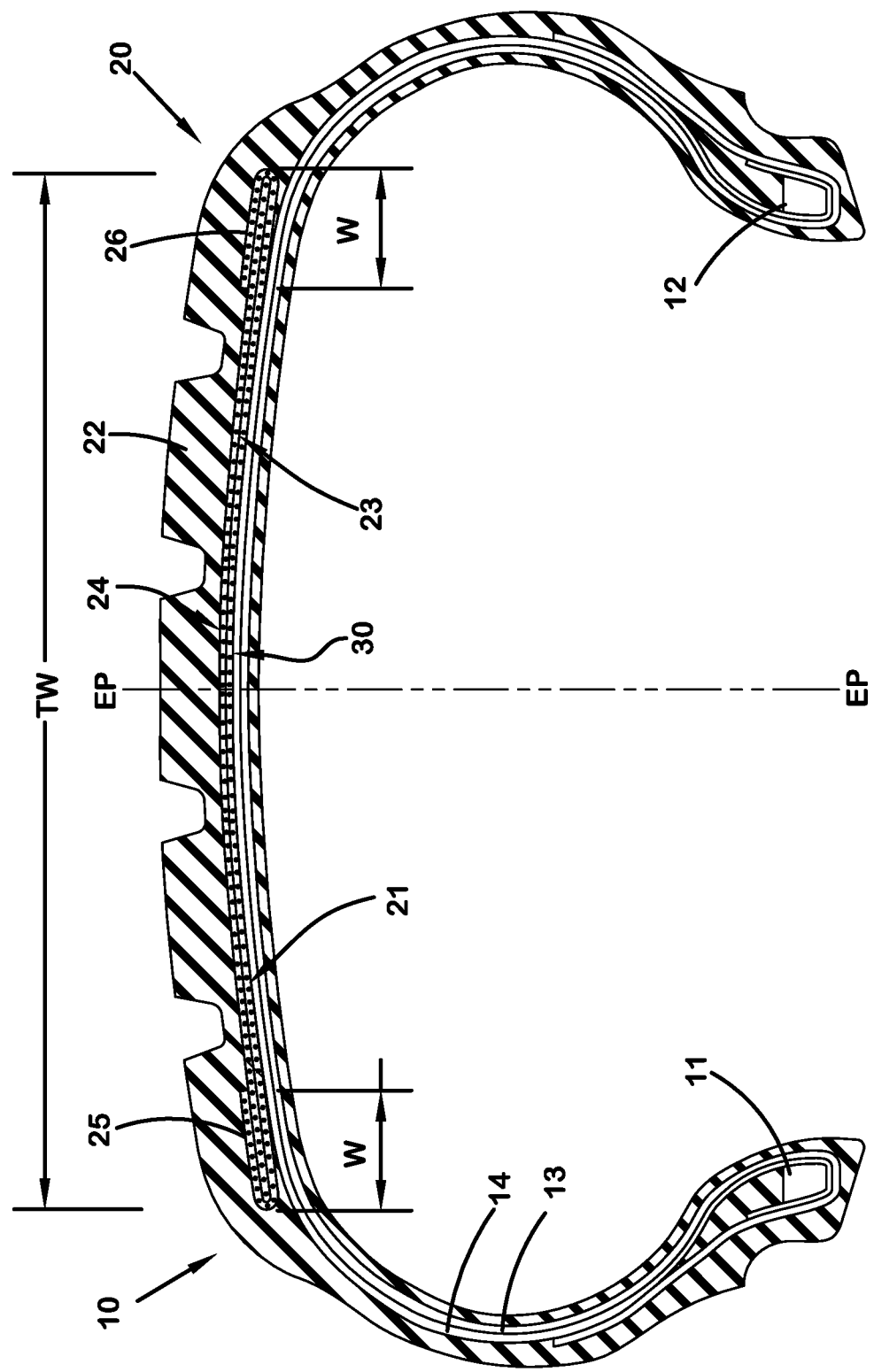
FIG. 1 is a cross-sectional view of an example tire for use with the present invention.

With reference to FIG. 1, there is represented an example tire 10, pneumatic or non-pneumatic, for use with the present invention. The tire 10 may have a pair of substantially inextensible bead cores 11, 12 axially spaced apart with two carcass plies 13, 14 extending between the bead cores. The carcass plies may be folded axially and radially outward about each of the bead cores 11, 12 and be reinforced by cords substantially parallel to each other in the same ply at an angle of 50° to 90° with respect to the equatorial plane (EP) of the tire 10. Cords belonging to adjacent carcass plies 13, 14 may generally have opposite angles crossing each other at an angle of at an angle of 2 degrees to 5 degrees. The cords of the carcass plies 13, 14 may be any suitable material, such as steel, nylon, rayon, aramid, and/or polyester. The tire 10 may have carcass plies 13,14 of side-by-side polyester or rayon cables and a crown area 20 reinforced by a belt assembly 21 located radially inward of the tire tread 22. The tire 10 may have an aspect ratio between 25 and 65.

The tire 10 may further include a belt structure 30 with an essentially rigid folded belt 23 and a cut belt 24 disposed radially outward of the folded belt. Both belts 23, 24 may be reinforced with aramid cables or yarns. The belts 23, 24 may have identical or different constructions. Such cords may be treated (coated) with one or more layers of adhesive in a process known as dipping. The modulus of a treated cord may be a function of the twist of the different yarns used in the cord, the cord twist, and the manner that the cord is subjected to the dipping operation.

Cords of the folded belt 23 may be substantially parallel to each other and make an angle of 15° to 40° with respect to the equatorial plane (EP) of the tire 10. The axially outer portions of the folded belt 23 may be folded back on both lateral sides in a radially outward direction over axial edges of the cut belt 24 with the folded portions 25, 26 being symmetrical with respect to the equatorial plane (EP). The folded portions 25, 26 may each have a transverse width between 5% and 30%, or 15% and 30% of the tread width (TW).

Figure 2:
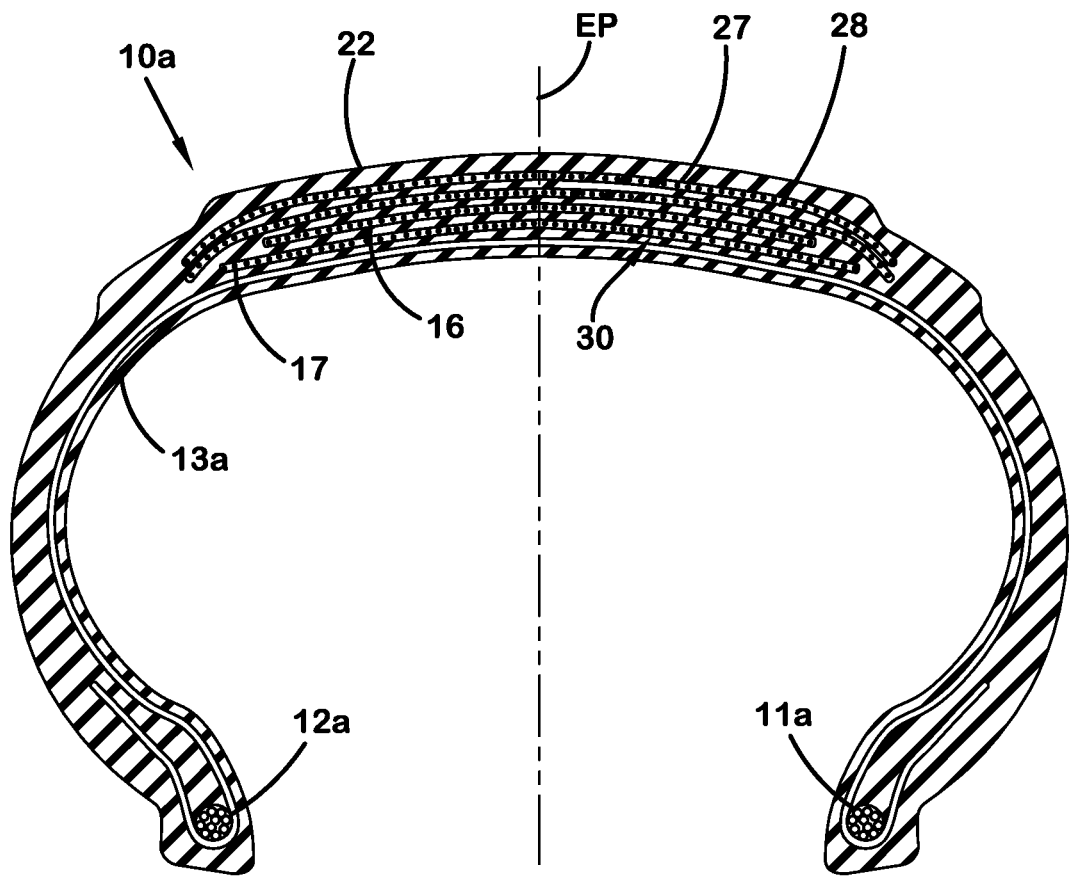
FIG. 2 is a cross sectional view of another example tire for use with the present invention.

As shown in FIG. 2, another example tire 10a, for use with the present invention, may include one carcass ply 13a wrapped around beads 11a,12a. The belt structure 30 may include belts 16, 17 reinforced with aramid cords and overlays 27, 28 disposed radially outward of the belts 16, 17. The belts 16, 17 may have identical or different constructions. The overlays 27, 28 may be single sheets of overlay material, a cut overlay (e.g., reinforcement cords in the overlay discontinuous at random locations throughout the tire), and/or a spiral overlay. The reinforcing cords in the overlay 27, 28 may comprise nylon, polyester, polyamine, aramid, and/or any other suitable overlay reinforcement material.

Figure 3:
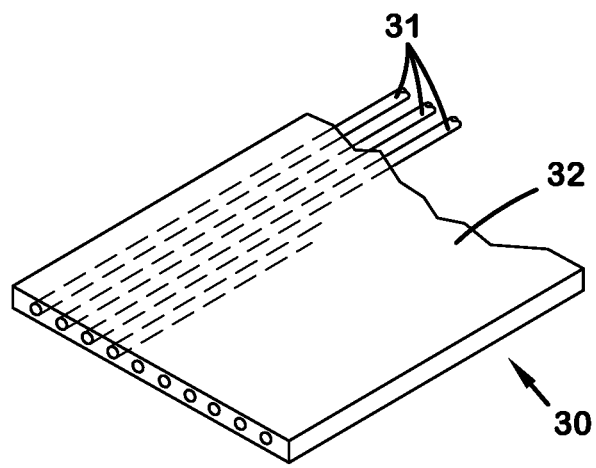
FIG. 3 is a perspective view of a reinforce belt composite in accordance with the present invention.

As shown in FIG. 3, in accordance with the present invention, the belts 16, 17, 23, 24 of the belt structure 30 may include a reinforced composite with reinforcement cords 31 of aramid embedded in a rubber matrix 32. The reinforcement cords 31 may be yarns of aramid having their component filaments twisted together a given number of turns per unit of length of the yarn (usually expressed in turns per inch, TPI, or in turns per meter, TPM). The aramid yarns may be twisted together to form a cord 31 with a twist level.

A first example aramid reinforcement cord 31 for the belt structure 30 may have a 1100/4 dtex construction and a cord distribution density of 15 ends per inch (EPI) to 35 EPI, or 22 EPI to 25 EPI, or 23 EPI. The first reinforcement cord 31 may have a twist between Z150/S150 turns per meter (TPM) and Z200/S200 TPM, or about Z180/S180 TPM, and a tension between 100 mN/tex and 200 mN/tex, or about 180 mN/tex, or about 120 mN/tex.

A second example aramid reinforcement cord 31 for the belt structure 30 may have a 1210/3 dtex construction and a cord distribution density of 15 ends per inch (EPI) to 35 EPI, or 22 EPI to 25 EPI, or 24 EPI. The second reinforcement cord 31 may have a twist between Z150/S150 turns per meter (TPM) and Z250/S250 TPM, or about Z200/S200 TPM, and a tension between 100 mN/tex and 150 mN/tex, or about 120 mN/tex.

The examples of the present invention described above should be considered as illustrative and not as limiting the scope of the present invention as defined in the following claims. The foregoing and other objects, features, and advantages of the present invention will be apparent from the above detailed descriptions of examples of the present invention, as illustrated in the accompanying drawings wherein like reference numbers represent like parts of the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A tire comprising:
   a carcass ply;
   a tread disposed radially outward of a crown region of the carcass ply; and
   a belt structure having an overall axial width substantially equal to a tread width interposed between the tread and the crown region in circumferential surrounding relation to the carcass ply, the belt structure including a first belt layer and a second belt layer radially adjacent the first belt layer, the first belt layer including a first reinforced composite with first reinforcement cords embedded in a first rubber matrix, the first reinforcement cords having a construction of 1100/4 dtex with a twist between 150 TPM and 250 TPM and a dipping tension between 100 mN/tex and 200 mN/tex, the second belt layer includes a second reinforced composite with second reinforcement cords embedded in a second rubber matrix, and the second reinforcement cords having a construction of 1210/3 dtex with a twist between 150 TPM and 250 TPM and a tension between 100 mN/tex and 200 mN/tex.

2. The tire as set forth in claim 1 wherein the first reinforcement cords have a Z twist of 180 TPM.

3. The tire as set forth in claim 2 wherein the first reinforcement cords have a S twist of 180 TPM.

4. The tire as set forth in claim 2 wherein the second reinforcement cords have a Z twist of 200 TPM.

5. The tire as set forth in claim 4 wherein the second reinforcement cords have a S twist of 200 TPM.

6. The tire as set forth in claim 1 wherein the first reinforcement cords have a density within the first rubber matrix between 15 EPI and 35 EPI.

7. The tire as set forth in claim 6 wherein the first reinforcement cords have a density within the first rubber matrix between 22 EPI and 25 EPI.

8. The tire as set forth in claim 7 wherein the first reinforcement cords have a density within the first rubber matrix of about 23 EPI.

9. The tire as set forth in claim 1 wherein the second reinforcement cords have a density within the second rubber matrix between 15 EPI and 35 EPI.

10. The tire as set forth in claim 9 wherein the second reinforcement cords have a density within the second rubber matrix between 22 EPI and 25 EPI.

11. The tire as set forth in claim 10 wherein the second reinforcement cords have a density within the second rubber matrix of about 24 EPI.

12. The tire as set forth in claim 1 wherein the first reinforcement cords are formed from aramid.

13. The tire as set forth in claim 1 wherein the second reinforcement cords are formed from aramid.

14. The tire as set forth in claim 1 wherein the first and second reinforcement cords are both formed only from aramid.

15. A belt structure for a tire comprising:
    a first belt layer disposed radially inward from a tread portion of the tire and radially outward of a crown portion of a carcass ply, the first belt layer having first aramid reinforcement cords each with a construction of 1100/4 dtex, a twist between 150 TPM and 250 TPM, and a dipping tension between 100 mN/tex and 200 mN/tex; and
    a second belt layer radially interposed between the first belt layer and the crown portion of the carcass ply, the second belt layer having second aramid reinforcement cords each with a construction of 1210/3, a twist between 150 TPM and 250 TPM, and a tension between 100 mN/tex and 200 mN/tex.

16. The belt structure as set forth in claim 15 wherein the first reinforcement cords have a Z twist of about 180 TPM.

17. The belt structure as set forth in claim 15 wherein the first reinforcement cords and the second reinforcement cords both have a density within a first rubber matrix and a second rubber matrix, respectively, between 15 EPI and 35 EPI.

18. The belt structure as set forth in claim 15 wherein the first reinforcement cords and the second reinforcement cords both have a density within a first rubber matrix and a second rubber matrix, respectively, between 22 EPI and 25 EPI.

19. The belt structure as set forth in claim 15 wherein the first reinforcement cords have a density within a first rubber matrix of 23 EPI and the second reinforcement cords have a density within a second rubber matrix of 24 EPI.

* * * * *